US 6,626,401 B2

United States Patent
Fraser

(10) Patent No.: US 6,626,401 B2
(45) Date of Patent: Sep. 30, 2003

(54) AFT FUSELAGE CONTROL SYSTEM FOR FORWARD LIFTING ELEVATOR AIRCRAFT

(76) Inventor: Norman Thomas Laurence Fraser, 4597 Candleberry Ave., Seal Beach, CA (US) 90740-3026

( * ) Notice: Subject to any disclaimer, the term of this patent is extended or adjusted under 35 U.S.C. 154(b) by 0 days.

(21) Appl. No.: 10/120,055

(22) Filed: Apr. 9, 2002

(65) Prior Publication Data

US 2002/0134892 A1 Sep. 26, 2002

Related U.S. Application Data

(63) Continuation-in-part of application No. 09/811,813, filed on Mar. 20, 2001.

(51) Int. Cl.[7] .............................................. B64C 1/00
(52) U.S. Cl. ........................................ 244/221; 244/213
(58) Field of Search ................................ 244/221, 3.21, 244/3.24, 3.3, 35 R, 39, 206, 213, 214, 215, 45 R, 47, 48, 49, 179, 180, 181, 187, 220, 225, 87, 88, 89, 90 L, 90 A, 90 B, 113, 110 D

(56) References Cited

U.S. PATENT DOCUMENTS

| | | | |
|---|---|---|---|
| 1,413,086 A | | 4/1922 | White |
| 2,344,945 A | * | 3/1944 | Knox et al. ................. 244/217 |
| 2,363,550 A | | 11/1944 | Reichert |
| 2,398,710 A | * | 4/1946 | King .......................... 244/113 |
| 2,421,870 A | * | 6/1947 | Dornier et al. ............. 244/113 |
| 2,430,793 A | | 11/1947 | Wells |
| 2,444,291 A | * | 6/1948 | Gray .......................... 244/113 |
| 2,461,967 A | * | 2/1949 | Devlin et al. ............... 244/113 |
| 2,525,844 A | * | 10/1950 | Weaver ....................... 244/113 |
| 2,698,149 A | * | 12/1954 | Greenwood et al. ........ 244/113 |
| 2,773,659 A | | 12/1956 | Feeney |
| 2,942,813 A | | 6/1960 | English |
| 3,128,068 A | * | 4/1964 | Pauli ......................... 244/129.5 |
| 3,312,429 A | * | 4/1967 | Hull et al. ................. 244/53 R |
| 3,848,831 A | * | 11/1974 | Geary ....................... 244/45 R |
| 4,003,533 A | * | 1/1977 | Carter et al. ................ 244/217 |
| 4,165,849 A | * | 8/1979 | Fox ............................. 244/113 |
| 4,245,802 A | * | 1/1981 | Jones, Jr. .................. 244/17.19 |
| 4,372,507 A | * | 2/1983 | Denniston ................... 244/113 |
| 4,648,567 A | * | 3/1987 | Maudal et al. ............. 244/3.24 |
| 4,790,494 A | * | 12/1988 | Kohn ............................ 244/87 |
| 2002/0079404 A1 | * | 6/2002 | Schroeder et al. ........... 244/3.3 |
| 2002/0134892 A1 | * | 9/2002 | Fraser ........................ 244/221 |

* cited by examiner

*Primary Examiner*—Charles T. Jordan
*Assistant Examiner*—Stephen A Holzen
(74) *Attorney, Agent, or Firm*—James A. Barry, Jr.

(57) ABSTRACT

A system providing aft fuselage flight controls on forward lifting elevator aircraft. My invention relates to aft fuselage controls on a forward lifting elevator aircraft, with the main lifting wing placed aft on the fuselage, and equipped with trailing edge flaps. My embodiment includes a means for controlling a nose down pitching condition produced by lowering trailing edge flaps, using aft vertical flaps 2. The design of the aft vertical flaps 2 produces a tail-down moment to counter the main aft wing trailing edge flap action. In addition, the aft vertical flaps 2 add drag to the aircraft when deployed.

2 Claims, 2 Drawing Sheets

AFT FUSELAGE CONTROL SYSTEM FOR FORWARD LIFTING ELEVATOR AIRCRAFT

CROSS-REFERENCE

My present application is a Continuation-In-Part of my parent U.S. patent application Ser. No. 09/811,813, filed Mar. 20, 2001, titled Improved Control System for Forward Wing Aircraft, currently pending. My present application is related by the same inventor for both applications, Norman T. L. Fraser. My parent application U.S. patent application Ser. No. 09/811,813, filed Mar. 20, 2001 is hereby incorporated in its entirety by reference.

TECHNICAL FIELD

My invention relates in general to flight controlling devices for aircraft. More specifically, my disclosure presents a system for aft fuselage flight controls, on forward lifting elevator aircraft.

BACKGROUND

Most aircraft in use are designed with the main wing surfaces forward of the rearwardly placed tail surfaces. Takeoff and landing requires negative tail lifting, which adds to the main forward wing loading, at a time when this condition is least desirable. Most conventional aircraft also have very complex leading edge slats on the main wing surfaces. These leading edge slats are costly to manufacture and are also heavy items.

My studies show that the forward lifting and flight controlling aircraft, do not have any great advantage over conventional aircraft, until the aircraft is in the 50–60 seat (passenger) category, and larger. In this category, the main aft wing can be brought forward from the end of the aircraft fuselage, and by doing so, balance the aircraft, by placing engines, supported by pods, on the aft fuselage. This advantage is such that trailing edge flaps can be used on the main aft wing.

A number of designs have suggested airbrakes for aircraft. Examples include U.S. Pat No. 1,413,086, titled Brake for Aircraft; U.S. Pat. No. 2,698,149, titled Aircraft Speed Retarding Device; U.S. Pat. No. 2,421,870, titled Air Brake for Aircraft; U.S. Pat. No. 2,444,291, titled Airplane Air Brake; U.S. Pat. No. 3,128,068 titled Petal Type Door For Cargo Aircraft; U.S. Pat. No. 2,525,844, titled Parachute for Aerodynamic Braking of Airplanes; U.S. Pat. No. 2,773,659, titled Full Powered Human Pilot-Autopilot Airplane Control System; U.S. Pat. No. 4,003,533, titled Combination Airbrake and Pitch Control Device; and U.S. Pat. No. 2,942,813 titled Combined Speed Brake, Escape Hatch and Baggage Access Door for Aircraft. The Speed Brake and Air Brake configurations include vertical and horizontal panels as well as air pockets and parachutes, with Speed Brake and Air Brake locations varying from the main wing to the aft end of the fuselage. A number of commercial aircraft in the past have used a split airbrake, with the hinges in the vertical or near vertical position, at the extreme end of the aircraft fuselage. The airbrake is opened on each side of the fuselage centerline, to generate drag as the aircraft moves in its directed flight path, to slow the aircraft down in flight, and, particularly, to slow down the aircraft pending a landing. However, these designs do not teach vertical panels to control a tail down movement. Some designs suggest flight controls to overcome forward lifting elevator aircraft flight control difficulty. Examples include U.S. Pat No. 2,363,550, titled Differentially Controlled Surfaces For Lateral and Directional Control; and U.S. Pat. No. 2,430,793, titled Aircraft Elevator Construction. However, these designs do not teach vertical panels to control a tail down movement for forward lifting elevator aircraft. It is significant, however, that none of the prior art patents identified above are concerned with the specific problems solved by applicant. Nor do they disclose devices, which would satisfactorily solve those problems.

A need exists in the art to counter a nose down pitching condition when main aft wing flaps are deployed to slow the aircraft down prior to landing on forward lifting elevator aircraft. Therefore, it would be desirable to provide a flight control system on forward lifting elevator aircraft having a means to counter a nose down pitching condition when main aft wing flaps are deployed to slow the aircraft down prior to landing.

SUMMARY OF MY INVENTION

It is a primary object of the my invention to provide a flight control system on forward lifting elevator aircraft having a means to counter a nose down pitching condition when main aft wing flaps are deployed to slow the aircraft down prior to landing.

My invention, in one embodiment, comprises an aft fuselage flight control system, for flight control of a forward lifting elevator aircraft. The aft fuselage flight control system attachment with the aft end of a fuselage of a forward lifting elevator aircraft, the aft fuselage flight control system comprising at least two aft vertical flaps with each aft vertical flap including a forward edge, and an aft trailing edge; a means for hingedly connecting the forward edge of each of the aft vertical flaps with the aft end of the fuselage of an aircraft such that in the direction of the rear of the aircraft, the forward edge forms an acute angle with the aircraft centerline, and such that the aft vertical flap may move out beyond an aircraft boundary layer; and an aft end of a fuselage connected with each of the means for hinging connected with the forward edge of the aft vertical flap at an angle between horizontal and vertical; and a means for spreading connected with each vertical flap and with the aft end of the fuselage such that the means for spreading can spread the flaps symmetrically and in an upward and outward motion with respect to the aircraft centerline.

Another embodiment of my invention further comprises an aft fuselage flight control system wherein the means for hingedly connecting the forward edge of each of the aft vertical flaps with the aft end of the fuselage includes a hinge axis defined by the centerline of the means for hingedly connecting, and wherein the means for spreading the aft trailing edge of the aft vertical flap further comprises; an actuating unit connected with the aft end of the fuselage of an aircraft on an aircraft fuselage centerline and at approximately a right angle with respect to the hinge axis; a piston rod moving out from the actuating unit; a piston rod attachment connected with the piston rod; a piston rod guide, located along the aircraft fuselage centerline, connected with the piston rod attachment to guide the piston rod in a straight line motion to ensure symmetrical opening on each side of the aircraft centerline when activated; a push rod connected with the piston rod attachment for each of the aft vertical flaps; a radius bracket with a lower radius arm connected with the push rod for each of the aft vertical flaps; a centerline hinge bearing connected with the aft end of the aircraft fuselage securing the radius bracket allowing the radius bracket to oscillate about it's hinged axis; two upper radius arm connected with the radius bracket; a control rod connected to each upper radius arm; and a flap bracket connected between each control rod and the aft vertical flap.

BRIEF DESCRIPTION OF THE DRAWINGS

These and other features, aspects, and advantages of my invention will become better understood with regard to the following description, appended claims, and accompanying drawings where:

DETAILED DESCRIPTION

My invention relates to flight controlling devices, for aircraft. More specifically, my disclosure presents a system for aft fuselage flight controls, on forward lifting elevator aircraft. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

Figure 1:
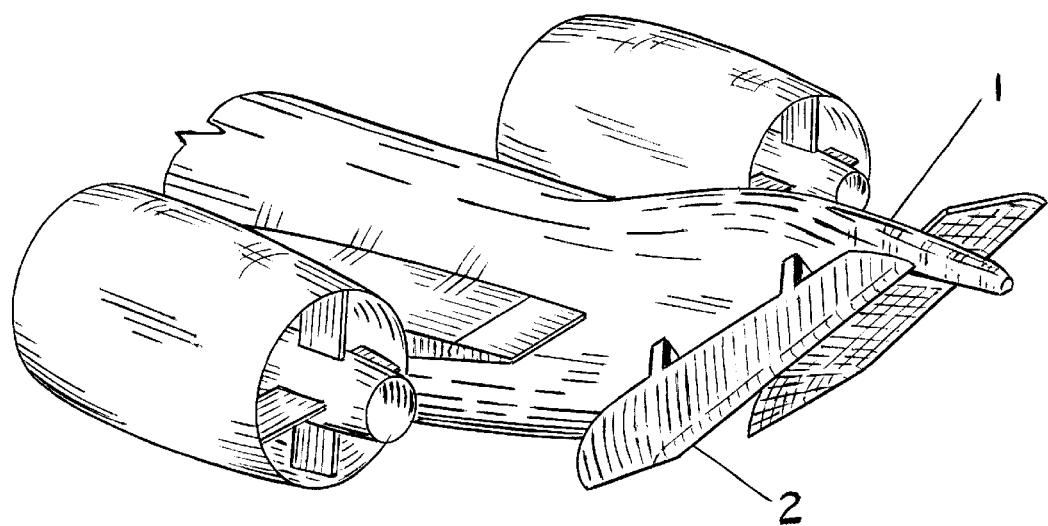
FIG. 1 is a perspective view of the rear end of a forward lifting elevator aircraft depicting an aft fuselage vertical airbrake, with tail-down pitching, moment control of my invention.

My invention is useful for rotating the rear end of the aircraft fuselage down in order to counter the main aft wing moment when main aft wing trailing edge flaps are deployed in flight, and also to add drag to slow the aircraft down prior to landing. An overview of an embodiment of my invention is shown in FIG. 1. Having main aft wing flaps is a relatively new factor in the design of forward lifting elevator aircraft. The arrangement of lifting, stabilizing, and flight controlling wing surfaces placed near the front of an aircraft, with the main lifting wing surfaces, placed aft, with trailing edge flaps, induce a nose down pitching moment to the aircraft. The advantage gained from the use of full main aft wing flaps is made possible by the use of my new split flap and airbrake combination. My invention comprises an aft vertical flap 2, with hinged moveable trailing edges, placed at an aft end of the aircraft fuselage 1. It will be seen that the aft vertical flap 2 is not in a true vertical position but the aft vertical flap 2 is at an angle up and aft from the lower aft end of the aircraft fuselage. An acute angle is formed between the aircraft centerline and the forward edge of the aft vertical flap 2. The design gives a natural balance and slowing to the aircraft as desired in flight, but more importantly, prior to landing the aircraft. This total design leaves the forward control surfaces of the forward lifting elevator aircraft intact to do their intended functions of lifting their portion of the aircraft weight and controlling elevation of the total aircraft in flight. In addition, giving yaw control independently of these newly introduced aft controls. A goal of my invention includes providing a flight control system on forward lifting elevator aircraft to counter a nose down pitching condition when main aft wing flaps are deployed to slow the aircraft down prior to landing.

Figure 2:
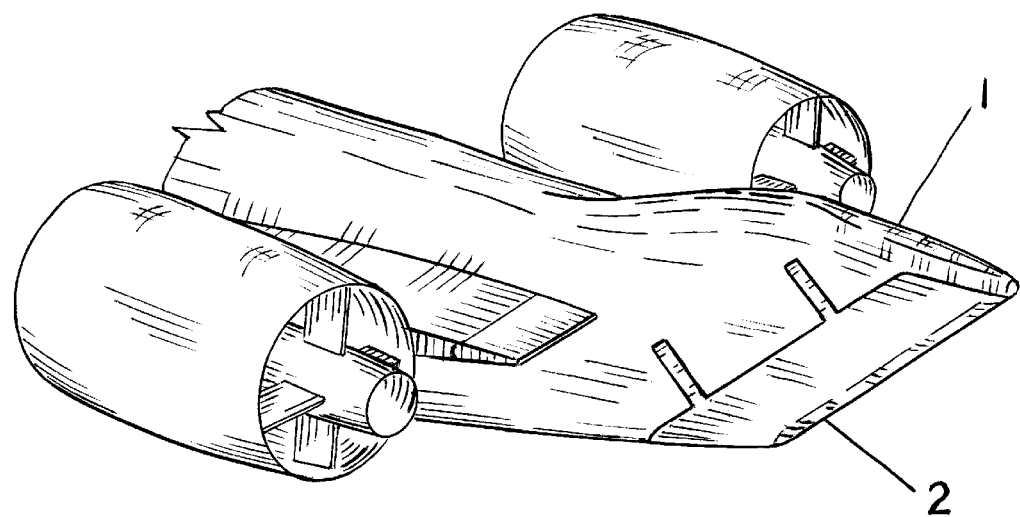
FIG. 2 is another perspective view of the rear end of a forward lifting elevator aircraft depicting an aft fuselage vertical airbrake, with tail-down pitching, moment control of my invention.

FIG. 2 is another perspective view. Whereas FIG. 1 shows the open position, FIG. 2 shows the normal closed flight position.

Figure 3:
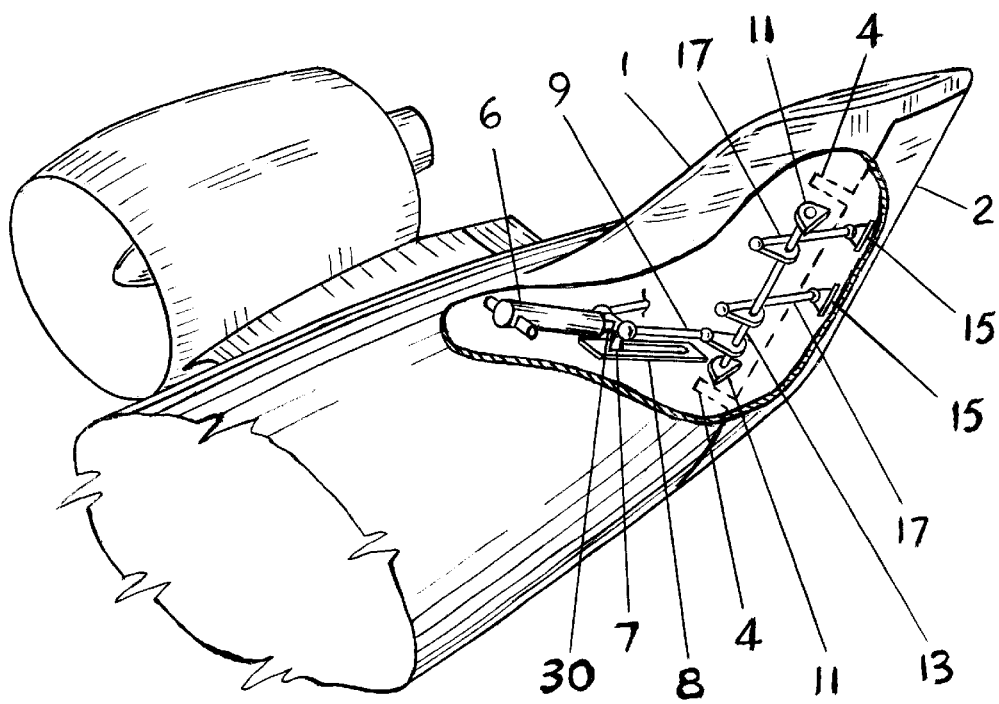
FIG. 3 is a perspective view of the rear end of an aircraft, showing various movable components to move the aft vertical flap of my invention.
Figure 4:
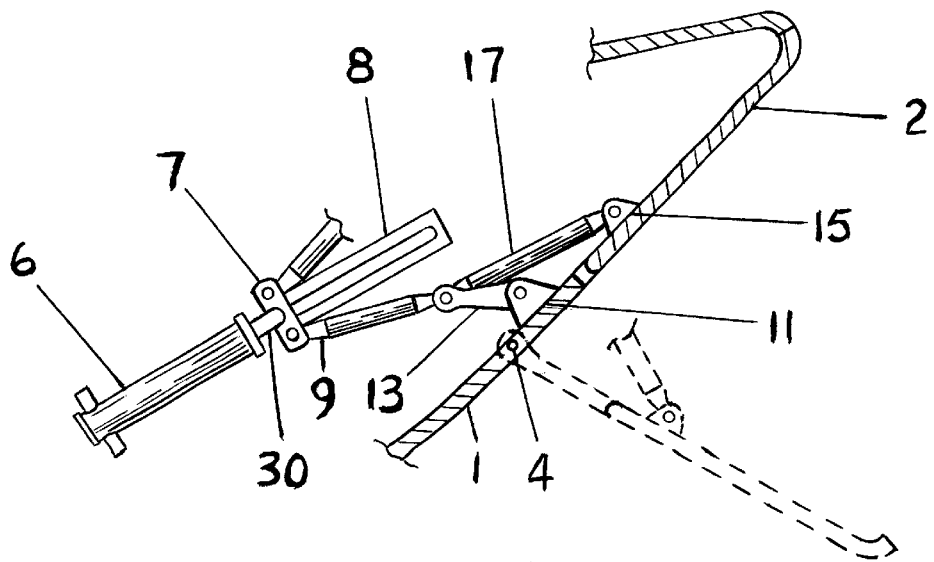
FIG. 4 is a cut section shown looking down on the hinge centerline through the upper hinge centerline of my invention.

FIG. 3 shows the aft end of the aircraft fuselage 1 with the aft vertical flap 2 in more detail. The aft vertical flap 2 has vertical flap hinge centers 4 on a forward edge of the aft vertical flap 2. A trailing edge of the aft vertical flap 2 moves up and aft from the lower aft end of the aircraft fuselage, on each side of the aircraft centerline. The aft vertical flaps 2 are designed to move out equally on each side of the aircraft with extended hinge arms that pivot about the fixed vertical flap hinge centers 4. The vertical flap hinge centers 4 are attached to the aircraft tail structure, to move the aft vertical flap 2 out beyond an aircraft boundary layer in order to generate an aircraft tail down movement. The maximum rotated out position of this aft vertical flap 2 is used when the aircraft is landing, and partial out positions of the aft vertical flap 2, plus maximum out position, may be used to slow down aircraft in flight, as commanded by the pilot activated controls. An actuating unit 6 is attached to the aircraft internal tail structure and is placed on the aircraft centerline to operate at approximately a right angle to a flap hinge centerline. A piston rod 30 moves out from the actuating unit 6. The piston rod 30 is attached to a piston rod attachment 7. The piston rod 30 is contained to move in a piston rod guide 8 to insure equal opening on each side of the aircraft centerline when activated. Attached to the piston rod 30 are two push rods 9, one for the left hand, and one for the right hand controls. The piston rod attachment 7 is guided in a straight-line motion by the piston rod guide 8, as the piston rod 30 moves out to activate the system controlled by the pilot. The system is symmetrical. The left hand part of the system is shown in FIGS. 3 and 4, and the right hand part of the system has a symmetrical arrangement. The further details refer to one side of the aircraft only. The push rod 9 is attached to the piston rod 30 at one end, and the other end is attached to a pivoted radius bracket's 13 lower radius arm. The radius bracket 13 comprises a shaft and three radius arms, one lower and two upper radius arms. Two centerline hinge bearings 11 at each end of the radius bracket 13 are attached to the aft end of the aircraft fuselage 1. The radius bracket 13 swings about the centerline hinge bearings 11, which are secured to the aft end of the aircraft fuselage 1. The radius bracket 13 has two upper radius arms, to which are attached control rods 17. The other end of the control rods 17 is attached to an aft vertical flap bracket 15, which is a permanent fixture of the aft vertical flap 2. The radius bracket 13 has a lower radius arm making the third radius arm of the radius bracket 13, which is attached to the push rod 9. The other end of the push rod 9 is attached to the piston rod attachment 7. The centerline hinge bearings 11 permit the radius bracket 13 to oscillate as required. The two upper radius arms of the radius bracket 13, are connected by the control rods 17 to these upper arms, and are also connected to two fixed aft vertical flap brackets 15 attached to the aft vertical flap 2. It will be seen that action by actuating unit 6, through the named components gives the desired movement to the aft vertical flap 2.

FIG. 4 is a view looking down the upper flap hinge centerline. This view is shown to clarify FIG. 3.

FIGS. 1, 2, 3, & 4 show a one-piece aft vertical flap on each side of the aft end of the aircraft fuselage. It is possible that with a large aircraft of 550–800 seats or larger, three separate versions of the one piece on each side of aft end of the aircraft fuselage may be designed, one above the other. Also, for a somewhat lesser size of aircraft, two separate versions of the one piece on each side of the aft end of the aircraft fuselage may be designed one above the other. The number of separate units to make up a complete system may be utilized, as design studies would indicate.

Many different systems may be used to activate these aft vertical flaps 2 to their maximum designed deployed position or to intended interim positions. The actuating units 6 could, in each case, be hydraulic or screw jack. All of the attachment joints have ball and socket (self-aligning) bearings. Many other methods of actuation may be employed without departing from the scope of my invention. I do not desire to limit my invention in all respects to the exact and specific disclosures here disclosed for movement of the vertical flight control system.

What is claimed is:

1. An aft fuselage flight control system attachment with the aft end of a fuselage of a forward lifting elevator aircraft, the aft fuselage flight control system comprising:
   a. at least two aft vertical flaps with each aft vertical flap including a forward edge, and an aft trailing edge;
   b. a means for hingedly connecting the forward edge of each of the aft vertical flaps with the aft end of the fuselage of an aircraft such that in the direction of the rear of the aircraft, the forward edge forms an acute angle with the aircraft centerline, and such that the aft vertical flap may move out beyond an aircraft boundary layer; and
   c. an aft end of a fuselage connected with each of the means for hinging connected with the forward edge of the aft vertical flap at an angle between horizontal and vertical; and
   d. a means for spreading connected with each vertical flap and with the aft end of the fuselage such that the means for spreading can spread the flaps symmetrically and in an upward and outward motion with respect to the aircraft centerline.

2. An aft fuselage flight control system as set forth in claim 1 wherein the means for hingedly connecting the forward edge of each of the aft vertical flaps with the aft end of the fuselage includes a hinge axis defined by the centerline of the means for hingedly connecting, and wherein the means for spreading the aft trailing edge of the aft vertical flap further comprises;
   a. an actuating unit connected with the aft end of the fuselage of an aircraft on an aircraft fuselage centerline and at approximately a right angle with respect to the hinge axis;
   b. a piston rod moving out from the actuating unit;
   c. a piston rod attachment connected with the piston rod;
   d. a piston rod guide, located along the aircraft fuselage centerline, connected with the piston rod attachment to guide the piston rod in a straight line motion to ensure symmetrical opening on each side of the aircraft centerline when activated;
   e. a push rod connected with the piston rod attachment for each of the aft vertical flaps;
   f. a radius bracket with a lower radius arm connected with the push rod for each of the aft vertical flaps;
   g. a centerline hinge bearing connected with the aft end of the aircraft fuselage securing the radius bracket allowing the radius bracket to oscillate about it's hinged axis;
   h. two upper radius arm connected with the radius bracket;
   i. a control rod connected to each upper radius arm; and
   j. a flap bracket connected between each control rod and the aft vertical flap.

* * * * *